United States Patent Office 3,441,477
Patented Apr. 29, 1969

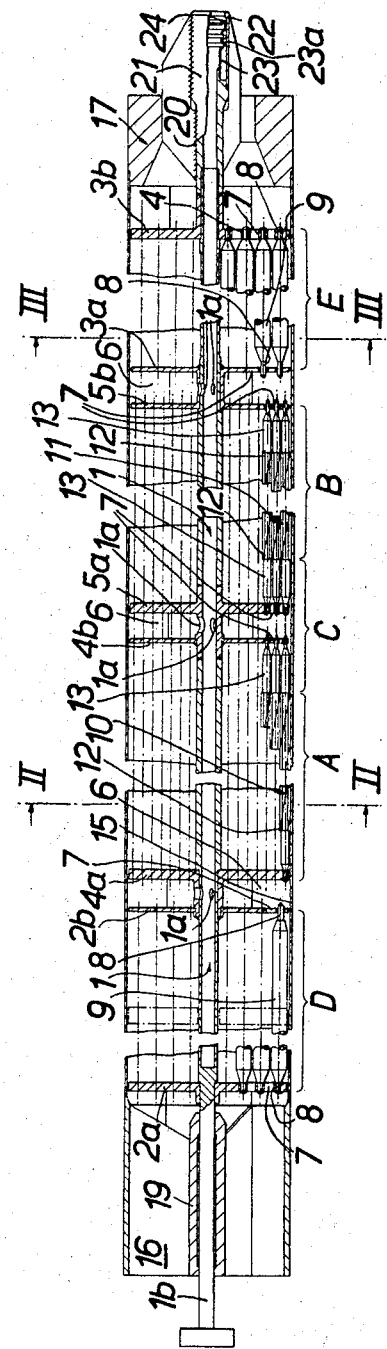

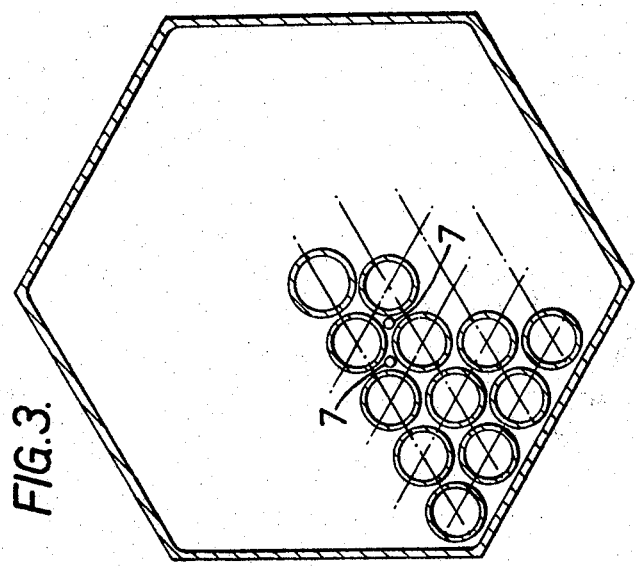
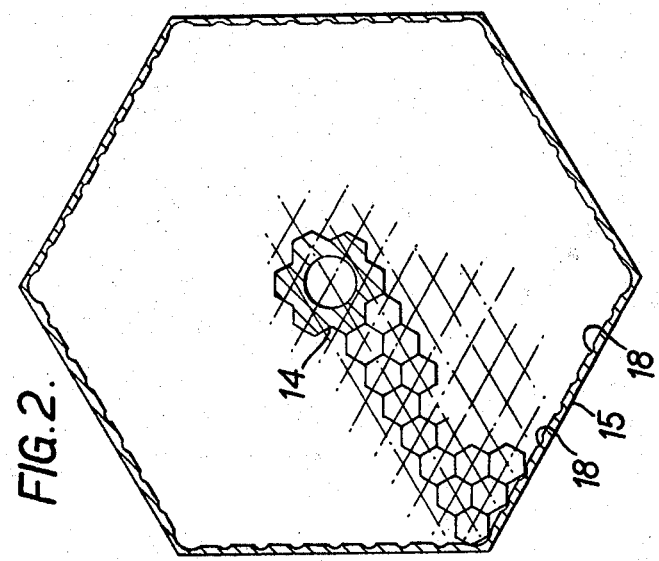

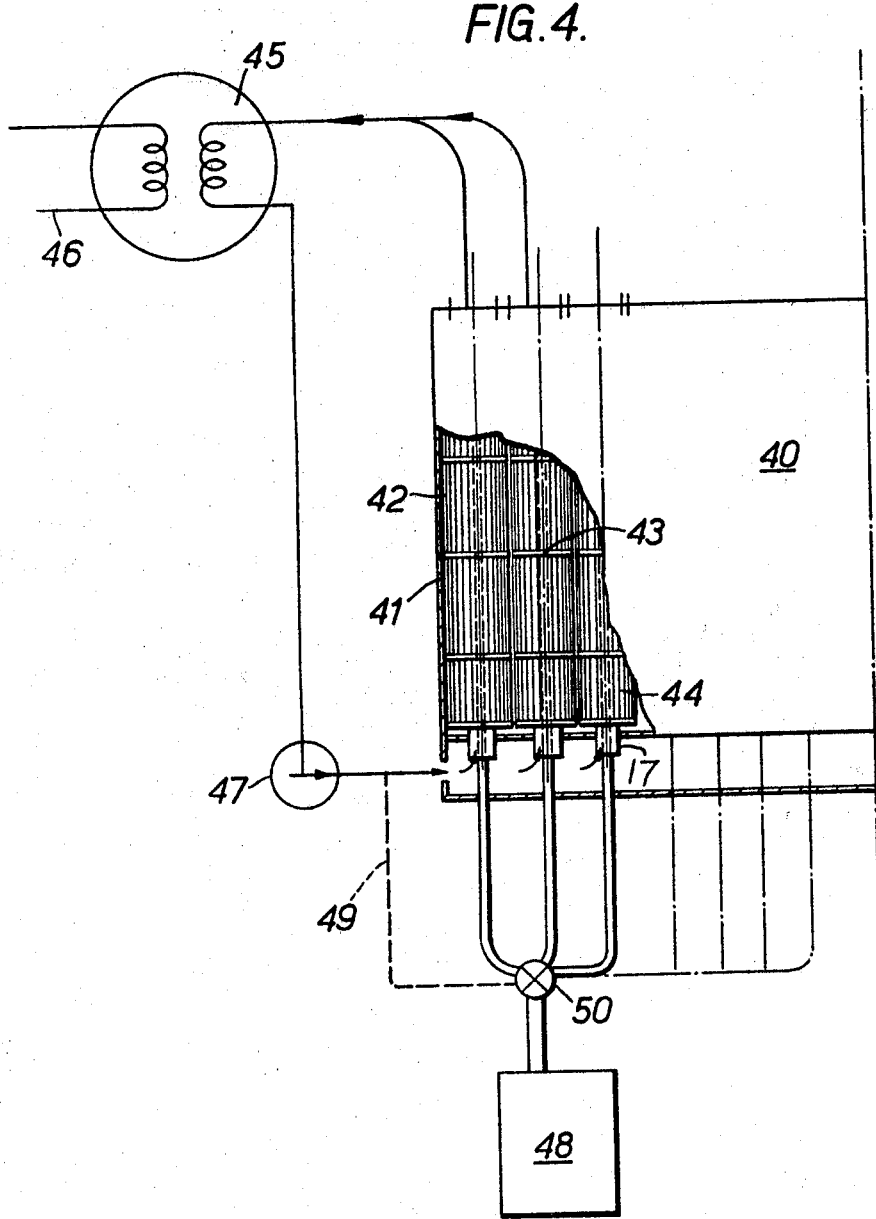

3,441,477
COOLING OF NUCLEAR REACTORS
Stanley Stamford, Bournemouth, James Bernard Terry, Poole, Charles Peter Gratton, Dorchester, and William Charles May, Poole, England, assignors to United Kingdom Atomic Energy Authority, London, England
Filed Apr. 24, 1967, Ser. No. 633,104
Claims priority, application Great Britain, Oct. 28, 1966, 48,547/66
Int. Cl. G21c 9/00, 3/30
U.S. Cl. 176—59      5 Claims

ABSTRACT OF THE DISCLOSURE

Cooling, and particularly emergency cooling, of nuclear reactors in which the fuel is in the form of pin clusters is effected from a sparge pipe located centrally of each cluster supplied with coolant. The sparge pipe has a number of spaced outlets feeding plenum chambers formed axially along the clusters, the chambers communicating with channels between both the adjacent clusters of fuel rods.

Background of invention

This invention relates to nuclear reactors and chiefly relates to so-called steam cooled reactors having highly rated fuel. In such reactors a fault in the primary coolant circuit which causes an interruption of the coolant flow soon results in overheating of the fuel with the possible consequence that the fuel may be damaged and may even melt. However unlikely an occurrence this may appear to be, it is considered prudent to provide some emergency cooling means to meet the contingency. To be effective an emergency cooling means should be capable of injecting coolant into the core under both failure and flow reversal of the main coolant.

Summary of invention

According to the invention a fuel element comprises a central coolant supply conduit having coolant distribution ports in its wall, said wall supporting a number of pairs of flanges such that the flanges of each pair support between them a cluster of fuel bearing pins, the pairs of flanges being disposed at axially spaced positions along the pipe so as to define between each pair a space for receiving coolant supplied from said conduit.

In a particular application, for instance in a fast reactor core configuration adapted for reactivity control in the manner described in co-pending U.S. patent application Ser. No. 633,070, which is assigned to the same assignee as that of the present application, the fissile fuel component of a fast reactor core is at least in part separated by a proportion of the fertile component, the remainder of which fertile component is in the form of an outer blanket the different kinds of fuels may be conveniently supported between flange pairs at appropriate positions. This construction allows a series of short fuel pins in place of the very long pins extending the full axial length of the element and, by arranging the pins to be of a diameter appropriate to its position in the coolant flowpath, pressure drops can be reduced and heat transfer surface optimised.

Description of the drawings

FIG. 1 is a side elevation of a fuel cluster in axial cross section,
FIG. 2 is a cross section of the line II—II of FIG. 1,
FIG. 3 is a cross section on the line III—III of FIG. 1, and
FIG. 4 shows a diagram of a reactor incorporating a core component shown in FIGS. 1–3.

Description of the preferred embodiments

In the drawings a central sparge pipe 1 forms at the same time the main structural member of, and the emergency coolant supply conduit, for a plurality of nuclear fuel rod clusters. For this purpose the lower end fitting 17 of the pipe 1 is connectable to a source of coolant and a number of ports 1a formed in the side wall through which emergency coolant is dispersed. Coolant for normal operation is passed axially through the clusters entering the cluster at one end and leaving at the other. The particular form of core shown is adapted for operation in accordance with the method outlined in the co-pending patent application mentioned above. With this object in view, the fuel composition in the fuel element along the axial length of the element varies in accordance with the distribution shown in FIGURE 1 of said patent application, the fissile component of the fuel element at A and B being separated at least in part by a proportion of the fertile component at C, whilst the remainder of the fertile component is disposed at D and E.

The sparge pipe 1 carries a number of pairs of flanges 2a, 2b; 3a, 3b; 4a, 4b; 5a, 5b; as shown, and each pair carry between them a cluster of fuel pins. The arrangement is such that the outer configuration of the cluster is hexagonal. The axial spacing of the flange pairs and the ports 1a is such that, between each flange pair, a coolant plenum 6 is formed, each communicating with the conduit by ports 1a and with the fuel pins by way of holes 7 in the flanges. The two end pairs 2a, 2b and 3a, 3b are drilled with a pattern of holes to receive the end fittings 8 of cans 9 containing fertile fuel and further holes 7 for the passage of coolant. Between the flanges 2a, 2b, 3a, 3b, the two further pairs of flanges designated 4a, 4b and 5a, 5b respectively are drilled to receive the end fittings of pins 10 and 11 and also with holes 7 for coolant as before. The pins 10 and 11 are of similar construction and comprise a cylindrical can which has an externally finned portion at 12 over the central part of their length and end portions which are unfinned. The pins 10, 11 bear the fissile component of the fuel over the major part of their length but, at a minor portion 13, support fertile fuel such that when the pins are supported between spiders 4a, 4b, 5a, 5b, a fertile fuel zone C separates the fissile components A and B. The finned portions are of the form having helical fins whose tips are machined to a hexagonal profile. This form of finning requires a special shaping of the outer surface of the sparge pipe wall with grooves 14, as shown in FIGURE 2. The whole assembly is enclosed by a shroud 15 which is fixed near its ends to the periphery of flanges 2a and 3b and to end fittings 16, 17 mounted on terminal portions of the sparge pipe. The inner contour of this shroud, where it lies adjacent the hexagonal profiled finned portion 12, is provided with indentations 18 as shown in FIGURE 2. Each of the end fittings is of spiderlike configuration supported from the central pipe so that, in operation, of the element coolant may flow axially through the shroud. The end fitting 16 comprises a tubular centre 19 secured to the spigot-like extension of the closed upper end of the sparge pipe and terminates in a handling feature. The end fitting 17 is the bottom end fitting. It supports the lower end of the shroud 15 by means of a spider and serves not only to seat the whole assembly but also to connect the sparge pipe to the supply of coolant. To this latter end, the sparge pipe extremity has an extension 20 which is formed as two co-axial thin walled pipes. The outer one of these designated 21 has a turned over end 22 whilst the inner one 23, forming an extension of the sparge pipe bore, has concertina folds in the wall terminating in a reentrant rim 24, lying within the outer pipe 21. The function of this feature is to facilitate the coupling of the sparge pipe to a coolant supply stub pipe and more specifically to promote the uncoupling. The coupling is achieved in a normal manner with component dangling from a charge machine by its end fitting 1b and the component being lowered until the rim 24 of the pipe 23 engages the stub pipe. The outer pipe 21 serves as a guide during this operation. When the time comes for the component to be withdrawn it is possible that the end of the pipe 23 may have become stuck to the stub pipe. If this be the case, an axial pull applied to the end fitting 1b will cause the tube 23 to extend as its concertina folds tend to straighten out. A given amount of extension will bring the turned over end of the pipe 21 up against the outer part of the re-entrant run of the inner tube 23 and an increased withdrawal effort will wrench the inner tube 23 from the stub pipe.

At the portion of the sparge pipe between each pair of flanges, the pipe has four orifices, or ports, 1a which communicate the pipe bore with the plenum chambers, so that coolant supplied to the pipe will spray through the orifices 1a into the plenum chamber to flow therefrom in one axial direction or the other according to the pressure conditions obtaining to cool the adjacent fuel pins.

In FIG. 4 a reactor 40 has its core composed of core components 41 and a main coolant circuit which within the core extends through the fuel element clusters 42 supported around a sparge pipe 43 corresponding to the pipe 1 in FIG. 1 and enclosed by open ended shroud 44. Hot coolant from the top of the shrouds is passed to heat exchanger 45 where it gives up its heat to a secondary coolant in circuit 46, whence the primary coolant is pumped by pump 47 to the reactor coolant inlet. The fitting 17 of each sparge pipe 43 is connected to a supply 48 of auxiliary coolant (which may be effective only in emergency on loss of primary coolant) to feed when necessary plenum chambers in the fuel component. If desired the supply of auxiliary coolant can be controlled by valve 50 under control link 49 which opens the valve 50 in response to loss of pressure in the primary coolant circuit.

We claim:
1. A nuclear reactor core having a number of nuclear fuel rods disposed parallel to one another in a number of clusters each cluster being supported about a central axially extending conduit, the fuel rods in each cluster being spaced apart to define a flowpath for a first coolant and means for defining plenum chambers between the clusters, means for communicating the conduit with a second supply of a second coolant and ports at axial spaced positions along the conduit to communicate the conduit with the plenum chambers.

2. A nuclear reactor core as claimed in claim 1 in which said flowpath is arranged such that the said first coolant flows through said flowpath in a predetermined axial direction according to the axial pressure drop throughout the core and wherein the conduit is arranged such that the second coolant is effective to cool the rods irrespective of the axial sense of the pressure drop.

3. A nuclear reactor core as claimed in claim 1 including a shroud surrounding the said cluster and defining an axial flow path for reactor coolant; the central conduit serving for emergency coolant.

4. A nuclear reactor core as claimed in claim 1 for operation with an above thermal neutron spectrum and employing supercritical steam as the main coolant, and including means for injecting water into the supply conduit under emergency conditions.

5. A nuclear reactor core as claimed in claim 1 in which at least one of the plenum chambers is formed between fuel pin clusters of different fuel compositions.

References Cited

UNITED STATES PATENTS

| | | | |
|---|---|---|---|
| 2,798,848 | 7/1957 | Kingdon | 176—72 X |
| 3,238,109 | 3/1966 | Kent et al. | 176—78 |

REUBEN EPSTEIN, *Primary Examiner.*

U.S. Cl. X.R.

176—38, 40, 75, 78